United States Patent
Kasai et al.

(10) Patent No.: US 9,778,887 B2
(45) Date of Patent: Oct. 3, 2017

(54) CONTROL METHOD, PRINTER, AND STORAGE MEDIUM

(71) Applicant: Seiko Epson Corporation, Tokyo (JP)

(72) Inventors: Tsutomu Kasai, Shimosuwa-machi (JP); Susumu Shiohara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/870,550

(22) Filed: Sep. 30, 2015

(65) Prior Publication Data
US 2016/0103641 A1    Apr. 14, 2016

(30) Foreign Application Priority Data

Oct. 10, 2014    (JP) ................................. 2014-208907
Oct. 15, 2014    (JP) ................................. 2014-210522

(51) Int. Cl.
*G06F 15/00*    (2006.01)
*G06F 3/12*    (2006.01)
*H04L 12/801*    (2013.01)
*G06K 15/02*    (2006.01)

(52) U.S. Cl.
CPC .......... *G06F 3/1236* (2013.01); *G06F 3/1212* (2013.01); *G06F 3/1221* (2013.01); *G06F 3/1284* (2013.01); *G06F 3/1286* (2013.01); *G06K 15/02* (2013.01); *H04L 47/193* (2013.01); *Y02B 60/1271* (2013.01)

(58) Field of Classification Search
USPC ....................................................... 358/1.15
See application file for complete search history.

(56) References Cited

U.S. PATENT DOCUMENTS

| | | |
|---|---|---|
| 2010/0250978 A1 | 9/2010 | Nakamura |
| 2011/0078464 A1 | 3/2011 | Yokomizo |
| 2011/0194133 A1* | 8/2011 | Fujisawa ............... G06F 3/1221 358/1.13 |
| 2013/0091366 A1 | 4/2013 | Nakamura |
| 2013/0198546 A1 | 8/2013 | Fujisawa |
| 2014/0363186 A1* | 12/2014 | Otsuka .................. G06F 3/1221 399/75 |

FOREIGN PATENT DOCUMENTS

| | | |
|---|---|---|
| JP | 2011-068038 A | 4/2011 |
| JP | 2013-161122 A | 8/2013 |
| JP | 2014-006929 A | 1/2014 |

* cited by examiner

*Primary Examiner* — Saeid Ebrahimi Dehkord
(74) *Attorney, Agent, or Firm* — Foley & Lardner LLP (57) ABSTRACT

A printer switches between and uses plural communication units according to the operating mode, can switch the operating mode appropriately to the operating conditions, and can improve power conservation. The printer has a network control unit with a first communication unit configured to communicate in a first operating mode; and a main control unit having a second communication unit configured to communicate in a second operating mode. The main control unit limits the power supply to the first communication unit in the second operating mode; and the second communication unit determines whether or not to go to the first operating mode based on content of data received in the second operating mode.

16 Claims, 5 Drawing Sheets

CONTROL METHOD, PRINTER, AND STORAGE MEDIUM

The present invention claims benefit from Japanese Application Nos. 2014-208907 filed on Oct. 10, 2014 and 2014-210522 filed on Oct. 15, 2014, which are hereby incorporated by reference in its entirety.

BACKGROUND

1. Technical Field

The present invention relates to a printer (the electronic device) that switches between and uses plural communication units appropriately to the operating mode, and relates particularly to a printer that can appropriately change the operating mode according to use of the printer and improve power conservation.

The invention also relates to a printer that changes and operates in an operating mode appropriate to the communication conditions, and relates particularly to a printer that can easily and appropriately return from the power conservation mode to the normal operating mode.

2. Related Art

Printers and other electronic devices typically execute processes based on communication from a host device that is connected to a network. Because such electronic devices therefore do not perform their main operation when not communicating with the host device, they often enter a power conservation mode that conserves energy by cutting off the power supply to part of the device.

JP-A-2011-68038 and JP-A-2013-161122 describe technology related to changing the operating mode. JP-A-2011-68038 teaches a communication control device that saves a job to be processed and maintains the power conservation mode without cancelling the power conservation mode even when a job to be processed by an information processing device is received. JP-A-2013-161122 teaches a data processing device for more appropriately managing information related to control of the power mode, and describes analyzing received packets to discard the packets or generate a response packet.

JP-A-2014-6929 describes technology that is related to a power conservation mode as described above, and determines whether or not to resume the normal operating mode when a device receives packets while in a power conservation state.

However, the devices described in JP-A-2011-68038 and JP-A-2013-161122 do not have two communication units separately provided for the normal operating mode and power conservation mode, and these disclosures are silent about the conditions for changing the operating mode in a device that has two communication units.

Some devices with two such communication units are also designed to enter the power conservation mode when communication with the host device is cut off. However, the host device may send requests to such devices at random times, and cannot enter the power conservation mode even if a request is not received for a long time in an operating environment where a quick response is needed because of the amount of time required to re-establish a communication link from the power conservation mode.

Such devices can be designed to uniformly resume the normal operating mode if TCP packets are received while in the power conservation mode, but this type of control may require a long time to change the operating mode depending on the operating conditions of the device, and because the power conservation mode is cancelled, is undesirable from the perspectives of power conservation and response speed.

JP-A-2014-6929 also requires a complicated process to determine whether or not to return to the normal operating mode.

Furthermore, because the condition for going to the power conservation mode is not limited to interruption of communication and differs according to the printer, the normal operating mode is preferably resumed under conditions appropriate to the conditions for entering the power conservation mode.

SUMMARY

An objective of the present invention is to provide a printer switches between and uses plural communication units according to the operating mode, can switch the operating mode appropriately to the operating conditions, and can improve response speed and power conservation.

Another objective of the invention is to provide a printer that can switch between the normal operating mode and a power conservation mode according to the communication conditions, and can easily and appropriately return from the power conservation mode to the normal operating mode.

To achieve the foregoing objective, one aspect of the invention is a control method of a printer configured to be able to communicate with an external device and to have a first communication unit configured to communicate with the external device in a first operating mode, and a second communication unit configured to communicate with the external device in a second operating mode, the control method including: limiting the power supply to the first communication unit in the second operating mode; and the second communication unit determining whether or not to go to the first operating mode based on content of data received in the second operating mode.

Further preferably in another aspect of the invention, the second communication unit responds to received data when the second communication unit decides to not go to the first operating mode, and sends the received data to the first communication unit when the second communication unit decides to go to the first operating mode.

Yet further preferably in another aspect of the invention, the second communication unit determines whether or not to go to the first operating mode based on at least one of the function requested by the received data and the amount of the received data.

Yet further preferably in another aspect of the invention, in the first operating mode, the first communication unit sends received data to the second communication unit, and the first communication unit goes to the second operating mode when data is not received for a specific time.

Yet further preferably in another aspect of the invention, the second communication unit communicates by TCP.

Yet further preferably in another aspect of the invention, the printer has a print mechanism unit, and the second communication unit includes a control unit configured to control the print mechanism unit; and in the first operating mode, the first communication unit sends received print request data to the second communication unit, and the control unit of the second communication unit controls the print mechanism unit to print based on the print request data.

Another aspect of the invention is a printer configured to be able to communicate with an external device, and to have a network control unit including a first communication unit for communicating with the external device in a first operating mode; and a main control unit including a second communication unit for communicating with the external device in a second operating mode. The main control unit limits the power supply to the first communication unit in the second operating mode; and the second communication unit determines whether or not to go to the first operating mode based on content of data received in the second operating mode.

Preferably, the printer also has a print mechanism unit; the network control unit sends received TCP packets to the main control unit, and the main control unit controls the print mechanism unit to print based on the TCP packets received from the network control unit, in the first operating mode.

Another aspect of the invention is a storage medium storing a program causing a control device of a printer configured to be able to communicate with an external device and to have a first communication unit configured to communicate with the external device in a first operating mode, and a second communication unit configured to communicate with the external device in a second operating mode, to execute a process, the program causing the control device to execute steps of: limiting the power supply to the first communication unit in the second operating mode; and the second communication unit determining whether or not to go to the first operating mode based on content of data received in the second operating mode.

Further preferably in another aspect of the invention, the control method includes going to the first operating mode when the second communication unit receives a TCP packet with a destination port number that matches the receiver port number of a TCP packet for the first communication unit in the second operating mode.

Further preferably in a control method according to another aspect of the invention, the second operating mode is a mode that operates with less power consumption than the first operating mode.

Further preferably in a control method according to another aspect of the invention, the first communication unit operates with a first CPU; the second communication unit operations with a second CPU; and the printer has a power supply control unit configured to limit the power supplied to the first CPU.

Further preferably, a control method according to another aspect of the invention also includes: changing the operating mode to the second operating mode when the first communication unit does not receive a TCP packet with a destination port number matching the receiver port number for a specific time while a communication connection is open in the first operating mode; and changing to the first operating mode when the second communication unit receives a TCP packet with a destination port number matching the receiver port number of a TCP packet for the first communication unit in the second operating mode.

Further preferably, a control method according to another aspect of the invention also includes: changing the operating mode to the first operating mode when the second communication unit receives a TCP packet with a destination port number matching the receiver port number of a TCP packet for the first communication unit in the second operating mode; and the second communication unit sending a TCP packet with a destination port number matching a reported receiver port number to the first communication unit.

Further preferably, a control method according to another aspect of the invention also includes the first communication unit reporting settings information of the first communication unit to the second communication unit when going to the second operating mode.

In a printer according to another aspect of the invention, the main control unit goes to the first operating mode when the second communication unit receives a TCP packet with a destination port number matching the receiver port number of a TCP packet for the first communication unit in the second operating mode.

A printer according to another aspect of the invention preferably also has a print mechanism unit. The network control unit sends received TCP packets to the main control unit, and the main control unit controls the print mechanism unit to print based on the TCP packets received from the network control unit, in the first operating mode; and the main control unit goes to the first operating mode when the second communication unit receives a TCP packet with a destination port number matching the receiver port number of a TCP packet for the first communication unit in the second operating mode.

The program stored on a storage medium according to another aspect of the invention preferably also includes a step causing the control device to go to the first operating mode when a TCP packet with a destination port number matching the receiver port number of a TCP packet for the first communication unit is received in the second operating mode.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures. The embodiments described below do not limit the technical scope of the invention. Note also that same or like parts are identified by the same reference numerals or reference symbols.

Embodiment 1

Figure 1:
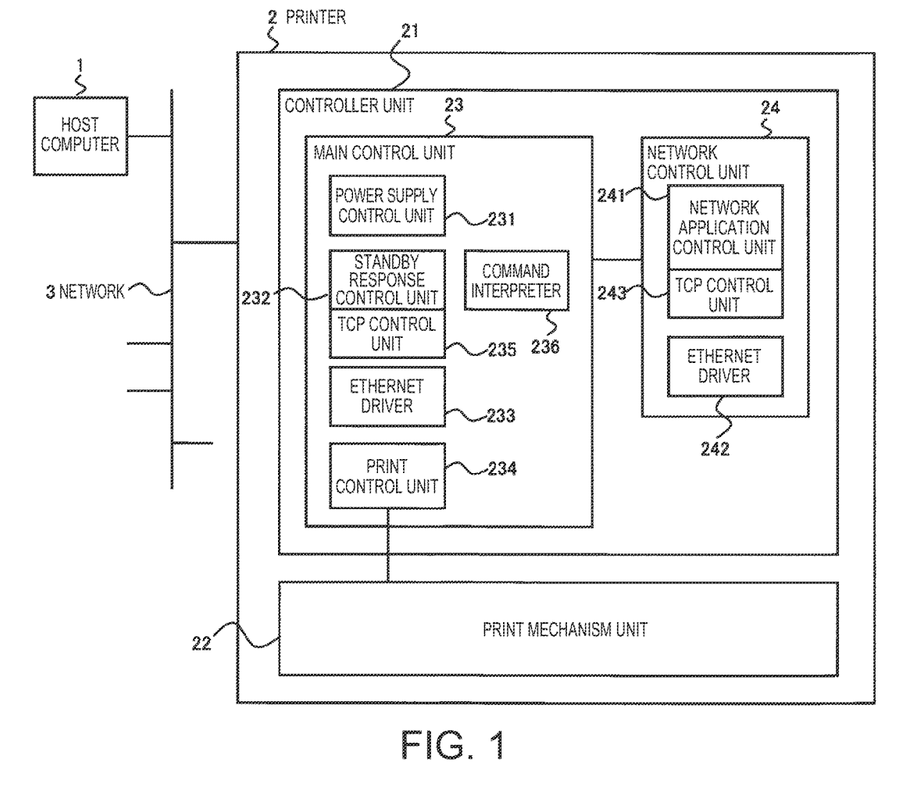
FIG. 1 is a block diagram of a first embodiment of a printing device (printer) as an example of an electronic device according to the invention.

FIG. 1 is a block diagram of a first embodiment of a printing device (printer) as an example of an electronic device according to the invention. The printer 2 shown in FIG. 1 is a printing device according to the invention, has a first communication unit and a second communication unit, and goes to a power conservation mode to limit or stop the power supply to the network control unit 24 conditionally, such as when a communication link to the host computer 1 is open but there is no communication through the link for a specific time. The first communication unit includes the network application control unit 241 and Ethernet driver 242 of the network control unit 24, which controls the communication process in the normal operating mode. The second communication unit includes the standby response control unit 232, Ethernet driver 233, and TCP control unit 235 of the main control unit 23, which controls the communication process in the power conservation mode.

When in the power conservation mode, the standby response control unit 232 of the main control unit 23 determines whether or not to return to the normal operating mode based on the content of received data, and when it determines to not resume the normal operating mode, the standby response control unit 232 executes a response process even if the received data is a TCP packet. If the standby response control unit 232 determines to resume the normal operating mode, it switches to the normal operating mode and passes the received packet to the network control unit 24. As a result, the printer 2 according to this embodiment can switch to and operate in the operating mode appropriate to the use of the device, and can improve power conservation accordingly.

As shown in FIG. 1, the printer 2 is a printer that runs a printing process based on print request data sent from a host computer 1 communicatively connected to a LAN (local area network) or other network 3. Communication between the host computer 1 and printer 2 uses TCP/IP or UDP/IP over Ethernet. Communications to the printer 2 include sending the above print request data and web access by TCP/IP, and sending status requests to the printer 2 by UDP/IP.

The printer 2 according to this embodiment has two operating modes as described above. The normal operating mode, which is the first operating mode, is a mode for operating without power conservation, and power is basically supplied to all parts of the printer 2. Primary functions such as printing are used in the normal operating mode.

The power conservation mode, which is the second operating mode, is a mode for operating while conserving power. The power supply to part of the printer 2 may be turned off. In the power conservation mode, the power supply to the network control unit 24 is limited or stopped, and the main control unit 23 handles control of communications requiring a standby response instead of the network control unit 24.

As shown in FIG. 1, the printer 2 has a controller unit 21 and print mechanism unit 22. The controller unit 21 is the part that controls printer 2 operation, and while not shown in the figures includes a CPU, RAM, ROM, NVRAM, or ASIC, for example.

The controller unit 21 includes the main control unit 23 and network control unit 24. The main control unit 23 is responsible for control other than communication control in the normal operating mode, and the network control unit 24 handles communication control in the normal operating mode. The main control unit 23 and network control unit 24 each have a CPU.

The functional configuration of the main control unit 23 includes, as shown in FIG. 1, a power supply control unit 231, standby response control unit 232, TCP control unit 235, command interpreter 236, Ethernet driver 233, and print control unit 234.

The power supply control unit 231 controls supplying power to other parts of the printer 2, and manages the power supply to the network control unit 24 when switching the operating mode.

The standby response control unit 232 controls the standby response function described above, and in the power conservation mode responds to requests from the host computer 1. Depending on the content of the received packets, the standby response control unit 232 also responds to TCP packets. The standby response control unit 232 also determines whether to return from the power conservation mode to the normal operating mode.

The TCP control unit 235 evaluates the content of TCP packets, and determines the type of packet from information such as the destination port number contained in the TCP header. The result of this decision is passed to the standby response control unit 232.

The command interpreter 236 interprets commands contained in the data portion of the received packets. The content of a received packet is determined more specifically as a result of interpretation by the command interpreter 236. The result is then passed to the standby response control unit 232.

The Ethernet driver 233 controls the Ethernet communication port (not shown in the figure) of the printer 2, and communication between the standby response control unit 232 and host computer 1 in the power conservation mode goes through the Ethernet driver 233.

The print control unit 234 controls printing, and controls the print mechanism unit 22 to execute the appropriate printing process.

Note that the power supply control unit 231, standby response control unit 232, TCP control unit 235, command interpreter 236, Ethernet driver 233, and print control unit 234 are embodied by programs describing the process content, and a CPU, RAM, ASIC or other hardware that executes processes according to the programs.

The network control unit 24 controls communication through the network 3, and as described above controls communication in the normal operating mode. When in the power conservation mode, the power supply to the network control unit 24 and CPU is stopped and the network control unit 24 stops operating. Alternatively, the CPU may enter a sleep mode with a limited power supply. When print request data is received from the host computer 1 in the normal operating mode, the network control unit 24 passes the data to the print control unit 234.

As shown in FIG. 1, the network control unit 24 includes a network application control unit 241, TCP control unit 243, and Ethernet driver 242. The network application control unit 241 controls communication at a top layer in the normal operating mode.

The TCP control unit 243 evaluates the content of TCP packets, and determines the type of packet from information such as the destination port number contained in the TCP header. The result of this decision is passed to the network application control unit 241.

The Ethernet driver 242 controls the Ethernet communication port (not shown in the figure) of the printer 2, and communication between the network application control unit 241 and host computer 1 in the normal operating mode goes through the Ethernet driver 242.

The network application control unit 241, TCP control unit 243, and Ethernet driver 242 are embodied by programs describing the process content, and a CPU, RAM, ASIC or other hardware that executes processes according to the programs.

The print mechanism unit 22 runs printing processes according to commands from the print control unit 234, and includes a conveyance unit that conveys paper or other print medium, and a print unit that prints on the print medium.

A printer 2 according to this embodiment of the invention as described above is characterized by communication control and the process of switching between operating modes, and the operation of the printer 2 described below focuses on these characteristics.

Figure 2:
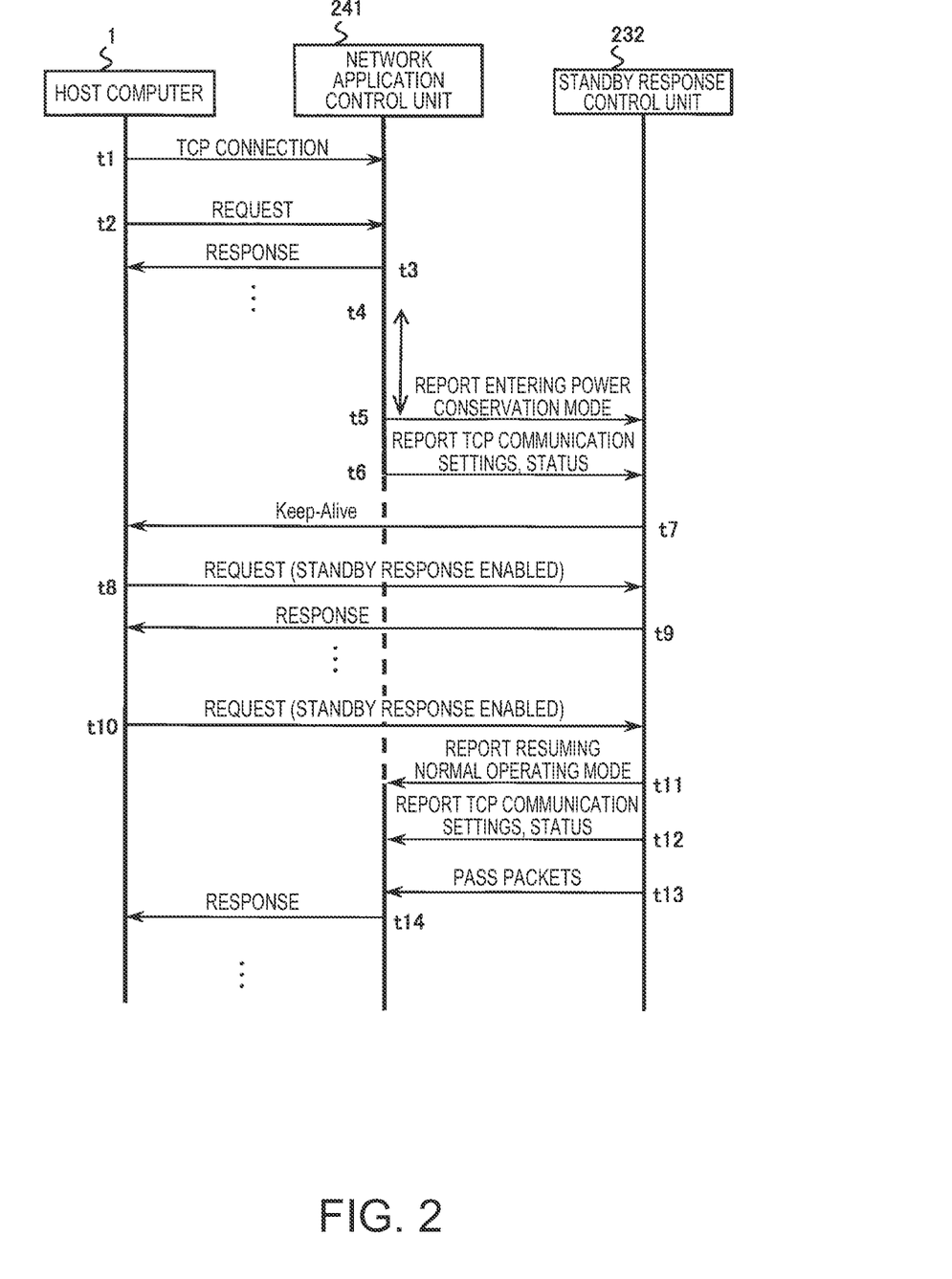
FIG. 2 is a timing chart showing an example of the process executed by a printer 2 according to the first embodiment of the invention.

FIG. 2 is a timing chart showing an example of this operation of the printer 2. When the printer 2 is in the normal operating mode at time t1 in FIG. 2, a communication link between the host computer 1 and the printer 2 is opened. More specifically, a TCP session is started between the host computer 1 and network application control unit 241 by a request/response handshake.

Because the network control unit 24 controls communication with the host computer 1 once this connection is opened, when a communication request (the request shown in FIG. 2) is received from the host computer 1 (time t2), the network application control unit 241 of the network control unit 24 sends a response (the response in FIG. 2) (time t3).

Such communication then continues, and when a condition for going to the power conservation mode is met, the network application control unit 241 knows to change to the power conservation mode. The condition for entering the power conservation mode in this embodiment is that there has been no communication for a specific time. Operation may therefore go to the power conservation mode even though a communication connection is established between the printer 2 and host computer 1. In the example shown in FIG. 2, the interval between time t4 and time t5 is equal to this specific time, and indicates there was no communication during this time.

When it is determined to go to the power conservation mode, the network application control unit 241 instructs the main control unit 23 to enter the power conservation mode (time t5). The network application control unit 241 then interrupts the Ethernet connection, and reports the TCP communication settings and communication status to the main control unit 23 (time t6). The settings specifically include information such as the IP address of the host computer 1, sequence number, timeout time, and other communication conditions.

When the main control unit 23 receives this report, the standby response control unit 232 stores the reported the TCP communication settings and communication status. Next, the standby response control unit 232 backs up the Ethernet settings. More specifically, it stores information such as the data destination set for the Ethernet communication port (hardware) at that time. This settings information is settings information for communication by the network control unit 24.

Next, the standby response control unit 232 changes the Ethernet settings to settings enabling a standby response, that is, settings enabling the standby response control unit 232 to control communication in the power conservation mode. As a result, the data destination is changed to specific memory in the main control unit 23.

The standby response control unit 232 then starts Ethernet communication, and instructs the power supply control unit 231 to handle power supply control for the power conservation mode. Receiving this command, the power supply control unit 231 cuts off the power supply to the network control unit 24. Alternatively, the CPU of the network control unit 24 is set to the sleep mode to limit the power supply. As a result, the network control unit 24 stops operating (the dotted line in FIG. 2 denotes this stopped state).

When transitioning to the power conservation mode is completed, the standby response control unit 232 controls communication in the power conservation mode. To prevent the host computer 1 from cutting the TCP connection, the standby response control unit 232 first communicates by TCP with the host computer 1 (time t4, Keep-Alive in FIG. 2).

When there is a communication from the host computer 1 for which a standby response is possible (the request at time t8), the standby response control unit 232 sends a response to the request (the response at time t9).

Whether or not a standby response to the request received from the host computer 1 is possible is determined as described below. That is, if the received request is a status request or other request by UDP/IP, the standby response control unit 232 determines that the standby response control unit 232 will respond while in the power conservation mode, that is, returns a standby response.

If the request was received by TCP/IP (is a TCP packet), the standby response control unit 232 determines according to predetermined rules if a response can be sent. These rules are stored in memory (such as NVRAM) of the main control unit 23, and can be changed by the user. These rules are set so that print requests and other requests requiring fast processing, registration of library data, program updates, and other requests involving a large amount of data are responded to in the normal operating mode, and requests not involving a large amount of data, such as HTTP web access requests that do not require high speed processing, are responded to by standby responses even when received by TCP communication.

Specific steps in this decision process include, first, the TCP control unit 235 checking the TCP packets received through the Ethernet driver 233, and determining the type of request from the content of the TCP header. For example, the requested function can be determined from the logical port number of the TCP packet denoted by the destination port number in the TCP header. The TCP control unit 235 sends the result of the decision to the standby response control unit 232. For example, the TCP control unit 235 reports if the packet is a packet requesting printing.

The standby response control unit 232 references the rules described above when this report is received, and if a decision is possible based on the reported content from the TCP control unit 235, determines whether to send a standby response or to return to the normal operating mode. For example, if a report indicating a print request packet was received, the standby response control unit 232 determines to return to the normal operating mode.

If a decision is not possible based only on the content reported from the TCP control unit 235, the standby response control unit 232 requests the command interpreter 236 to interpret commands contained in the TCP packet. The command interpreter 236 interprets the commands and returns the result to the standby response control unit 232. Based on the result from the command interpreter 236, the standby response control unit 232 determines whether to send a standby response or to return to the normal operating mode. For example, if a packet requesting registering library data was received, and the result from the command interpreter 236 is that the amount of data is less than a specific amount, the standby response control unit 232 determines to not return to the normal operating mode and send a standby response. Conversely, if the result is that the amount of data exceeds the specific amount, the standby response control unit 232 determines to return to the normal operating mode.

When the received packet is thus evaluated and the standby response control unit 232 determines to return to the normal operating mode (time t10), the standby response control unit 232 reports returning to the normal operating mode to the network application control unit 241 (time t11).

The standby response control unit 232 then interrupts the Ethernet connection, and changes the Ethernet settings to the content (settings) that were previously backed up (stored) as described above. More specifically, the settings used by the network control unit 24 for communication in the normal operating mode are restored.

Next, the standby response control unit 232 instructs the power supply control unit 231 to control the power supply for the normal operating mode. Based on this command, the power supply control unit 231 supplies power to the network control unit 24, or wakes the CPU of the network control unit 24 from the sleep mode. As a result, the network control unit 24 starts operating.

The standby response control unit 232 then reports the TCP communication settings and the communication status to the network application control unit 241 (time t12). These communication settings more specifically include information such as the IP address of the host computer 1, sequence number, timeout time, and other communication conditions.

Next, the standby response control unit 232 sends (passes) the TCP packet received at time t10 to the network application control unit 241 (time t13).

The network application control unit 241 receives the transmitted TCP packet, and starts communication by Ethernet. The network application control unit 241 then sends a response (the response in FIG. 2) to the received TCP packet to the host computer 1 (time t14).

Operation thereafter continues in the normal operating mode, and switching the normal operating mode and communication control proceed as described above.

As described above, the printer 2 according to the first embodiment of the invention has a network control unit 24 that handles the communication process in the normal operating mode, and a standby response control unit 232 that processes communication in the power conservation mode. In the power conservation mode, the power supply to the network control unit 24 is limited and the standby response control unit 232 handles standby responses or decides to return to the normal operating mode according to the function requested by the received data and/or the amount of received data. Communication can therefore be appropriately controlled according to the communication content, operation can continue in the power conservation mode in which the network control unit 24 is not operating for a longer time, and power conservation can be improved.

Furthermore, by appropriately setting the rules the standby response control unit 232 uses to determine whether or not to return to the normal operating mode, the operating mode can be changed and communication can be controlled appropriately to the operating conditions of the printer 2.

Furthermore, because the decision of whether or not to return to the normal operating mode is based on the type of data that was received and/or the amount of data, an appropriate decision can be made.

Furthermore, because the power conservation mode is entered even when communication with the host computer 1 is interrupted, a long time is not necessarily required to open communication when returning to the normal operating mode, the invention can be used even in environments in which print requests can come at random, the power conservation mode can be maintained for a longer time, and power conservation can be improved.

Furthermore, because TCP communication is possible in the power conservation mode, the power conservation mode can be maintained for a longer time, power conservation can be improved, and the invention can be easily used in many different operating environments.

Furthermore, because the network control unit 24 has a CPU separate from the main control unit 23, communication control in the normal operating mode is fast, and the CPU can be stopped in the power conservation mode for greater power conservation.

Embodiment 2

Figure 3:
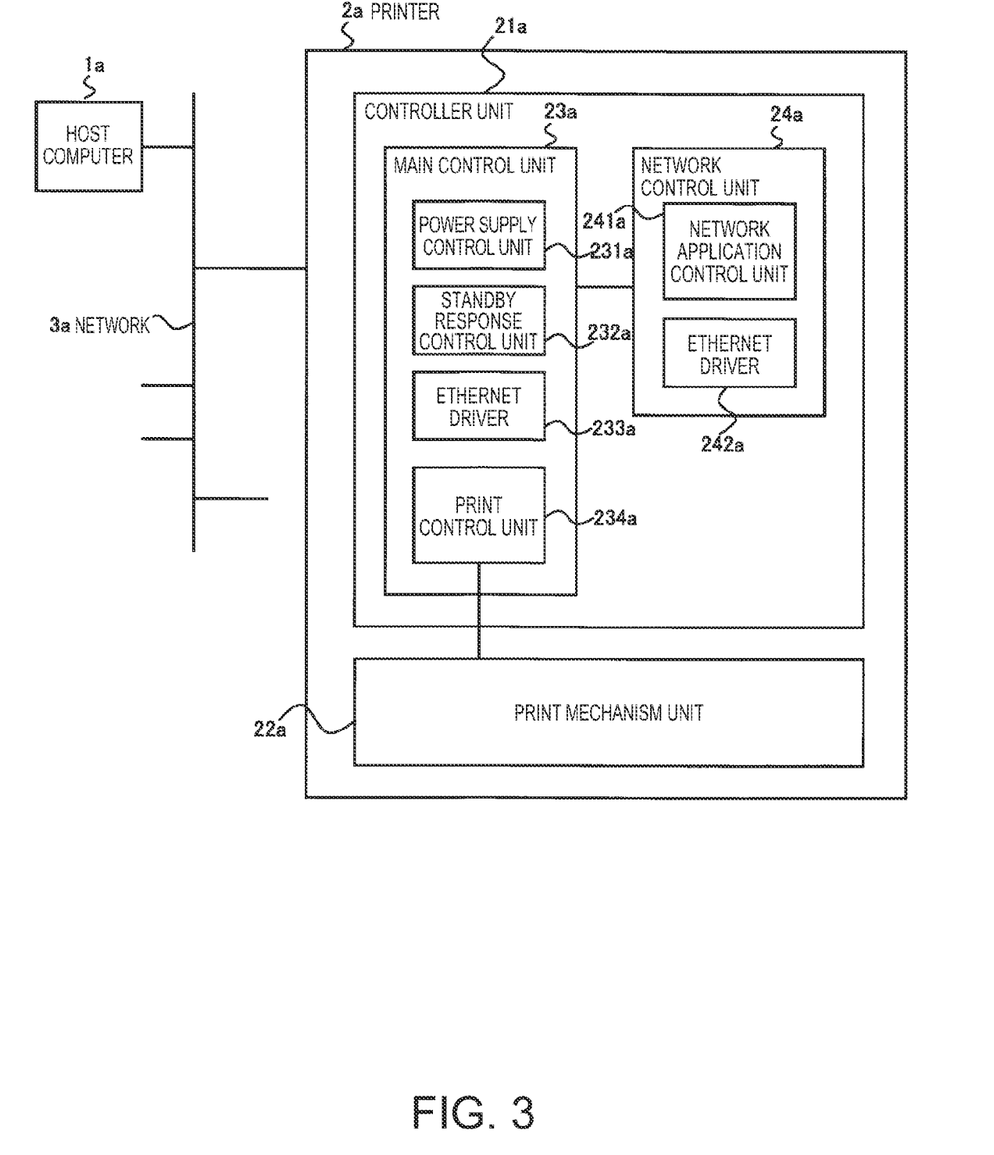
FIG. 3 is a block diagram of a second embodiment of a printing device (printer) as an example of an electronic device according to the invention.

FIG. 3 is a block diagram of a second embodiment of a printing device (printer) as an example of an electronic device according to the invention. The printer 2a shown in FIG. 3 is a printing device according to the invention, has a first communication unit and a second communication unit, and conditionally goes to a power conservation mode, such as when a communication link to the host computer 1a is open but there is no communication requesting a function such as printing (a main function) for a specific time. The first communication unit includes the network application control unit 241a and Ethernet driver 242a of the network control unit 24a, which controls the communication process in the normal operating mode. The second communication unit includes the standby response control unit 232a and the Ethernet driver 233a of the main control unit 23a, which controls the communication process in the power conservation mode.

When in the power conservation mode and a TCP header packet containing a destination port number matching a previously stored destination port number is received, the standby response control unit 232a of the main control unit 23a determines there was communication of a request related to a main function and runs a process of returning to the normal operating mode. The process of returning to the normal operating mode is therefore easily and appropriately run by the printer 2a.

As shown in FIG. 3, the printer 2a is a printer that runs a printing process based on print request data sent from a host computer 1a communicatively connected to a LAN (local area network) or other network 3a. Communication between the host computer 1a and printer 2a uses TCP/IP or TCP/UDP over Ethernet. Communications from the host computer 1a to the printer 2a include sending the above print request data, and sending requests for the status of the printer 2a.

The printer 2a according to this embodiment has two operating modes as described above. The normal operating mode, which is the first operating mode, is a mode for operating without power conservation, and power is basically supplied to all parts of the printer 2a. Predefined primary functions such as printing are used in the normal operating mode. Communication from the host computer 1a requesting a primary (main) function uses TCP/IP.

The power conservation mode, which is the second operating mode, is a mode for operating while conserving power. The power supply to part of the printer 2a may be turned off. Predefined standby responses, such as responding to the above status requests, can be executed as a standby response function in the power conservation mode. Communication from the host computer 1a requesting a standby response function uses TCP/UDP.

As shown in FIG. 3, the printer 2a has a controller unit 21a and print mechanism unit 22a. The controller unit 21a is the part that controls printer 2a operation, and while not shown in the figures includes a CPU, RAM, ROM, NVRAM, or ASIC, for example.

The controller unit 21a includes the main control unit 23a and network control unit 24a. The main control unit 23a is responsible for control other than communication control in the normal operating mode, and the network control unit 24a handles communication control in the normal operating mode. The main control unit 23a and network control unit 24a each have a CPU.

The functional configuration of the main control unit 23a includes, as shown in FIG. 3, a power supply control unit 231a, standby response control unit 232a, Ethernet driver 233a, and print control unit 234a.

The power supply control unit 231a controls supplying power to other parts of the printer 2a, and manages the power supply to the network control unit 24a when switching the operating mode.

The standby response control unit 232a controls the standby response function described above, and responds to requests from the host computer 1a in the power conservation mode. The standby response control unit 232a also determines whether to return from the power conservation mode to the normal operating mode.

The Ethernet driver 233a controls the Ethernet communication port (not shown in the figure) of the printer 2a, and communication between the standby response control unit 232a and host computer 1a in the power conservation mode goes through the Ethernet driver 233a.

The print control unit 234a controls printing, and controls the print mechanism unit 22a to execute the appropriate printing process.

Note that the power supply control unit 231a, standby response control unit 232a, Ethernet driver 233a, and print control unit 234a are embodied by programs describing the process content, and a CPU (first CPU), RAM, ASIC or other hardware that executes processes according to the programs.

The network control unit 24a controls communication through the network 3a, and as described above controls communication in the normal operating mode. When in the power conservation mode, the power supply to the network control unit 24a and CPU is stopped and the network control unit 24a stops operating. Alternatively, the CPU of the network control unit 24 may enter a sleep mode with a limited power supply. When print request data is received from the host computer 1a, the network control unit 24a passes the data to the print control unit 234a.

As shown in FIG. 3, the network control unit 24a includes a network application control unit 241a and Ethernet driver 242a. The network application control unit 241a controls communication at a top layer in the normal operating mode. The Ethernet driver 242a controls the Ethernet communication port (not shown in the figure) of the printer 2a. Communication between the network application control unit 241a and host computer 1a in the normal operating mode goes through the Ethernet driver 242a.

The network application control unit 241a and Ethernet driver 242a are embodied by programs describing the process content, and a CPU (second CPU), RAM or other hardware that executes processes according to the programs.

The print mechanism unit 22a runs printing processes according to commands from the print control unit 234a, and includes a conveyance unit that conveys paper or other print medium, and a print unit that prints on the print medium.

A printer 2a according to this embodiment of the invention as described above is characterized by the process of switching between operating modes, and the operation of the printer 2a described below focuses on this characteristic.

Figure 4:
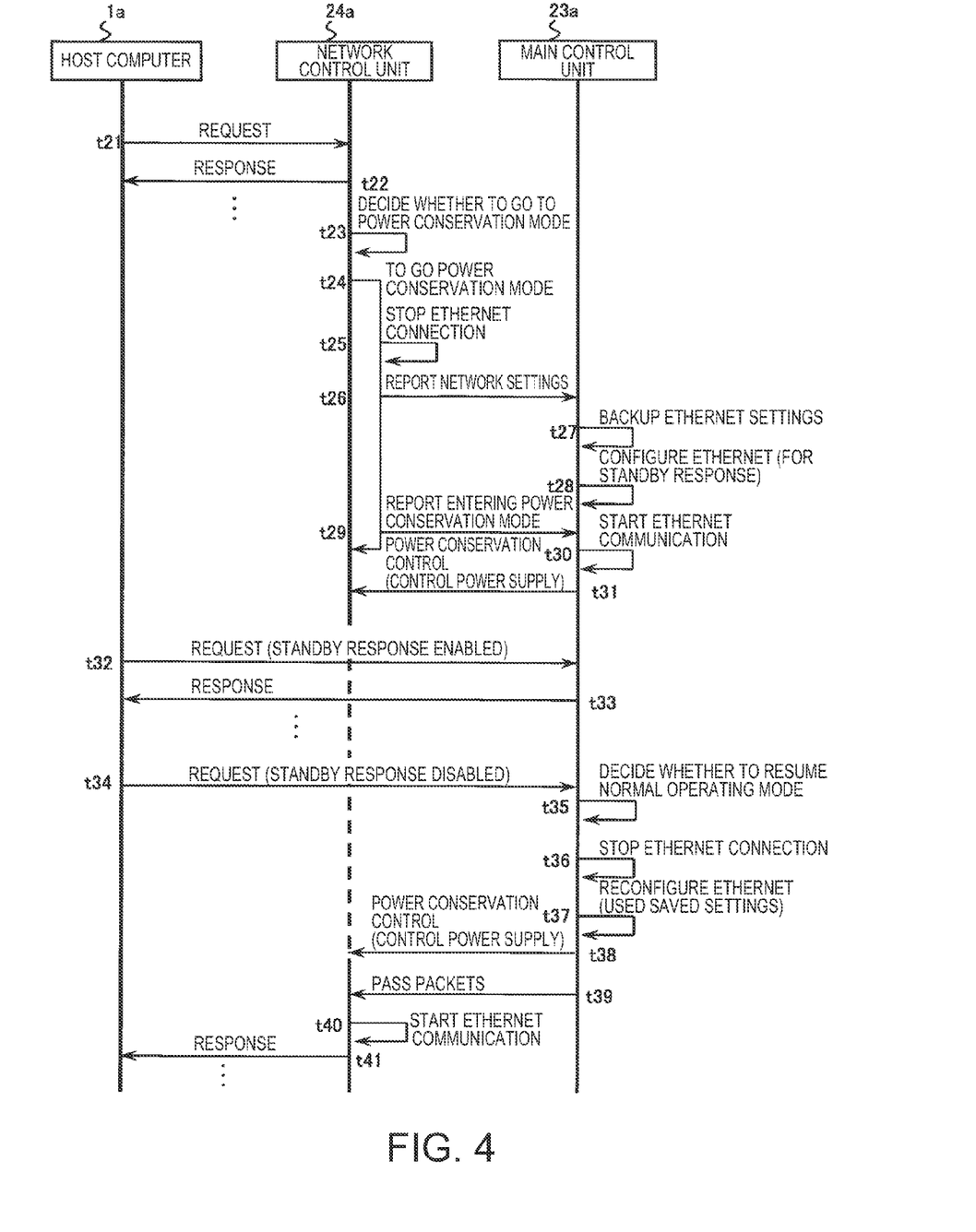
FIG. 4 is a timing chart showing an example of the process executed by a printer 2a according to the second embodiment of the invention.

FIG. 4 is a timing chart showing an example of this operation of the printer 2a. The printer 2a is in the normal operating mode at time t21 in FIG. 4. Because the network control unit 24a controls communication with the host computer 1a in the normal operating mode as described above, when a communication request (the request in the figure) is received from the host computer 1a (time t21), the network control unit 24a sends a response (the response in the figure) (time t22).

Such communication then continues, and when a condition for going to the power conservation mode is met, the network application control unit 241a of the network control unit 24a determines to change to the power conservation mode (time t23). The condition for entering the power conservation mode in this embodiment is that communication (a packet) requesting a main function, such as printing, that is enabled is not received within a specific time. Operation may therefore go to the power conservation mode even though a communication connection is established between the printer 2a and host computer 1a.

The network application control unit 241a then starts the process of going to the power conservation mode (time t24). The network application control unit 241a first interrupts the Ethernet connection (time t25).

Next, the network application control unit 241a reports the network communication settings to the main control unit 23a (time t26). The reported settings information includes, for example, the IP address, the valid logical port number (receiver port number) of the TCP packet predefined for each main function, such as printing, and the operating status. When the main control unit 23a receives this report, the standby response control unit 232a stores the reported information.

The standby response control unit 232a of the main control unit 23a then backs up the Ethernet settings (time t27). More specifically, the standby response control unit 232a stores information such as the data destination set for the Ethernet communication port (hardware) at that time. This settings information is settings information for communication by the network control unit 24a.

Next, the standby response control unit 232a changes the Ethernet settings to settings enabling sending a standby response, that is, settings enabling the standby response control unit 232a to control communication in the power conservation mode (time t28). As a result, the data destination is changed to specific memory in the main control unit 23a.

The network application control unit 241a then sends a report that the network control unit 24a entered the power conservation mode (time t29), and the standby response control unit 232a starts communication by Ethernet based on this report (time t30).

The standby response control unit 232a then instructs the power supply control unit 231a to control the power supply for the power conservation mode (time t31). Receiving this command, the power supply control unit 231a cuts off the power supply to the network control unit 24a. Alternatively, the CPU of the network control unit 24a is set to the sleep mode to limit the power supply. As a result, the network control unit 24a stops operating (the dotted line in FIG. 4 denotes this stopped state).

When transitioning to the power conservation mode is thus completed, the standby response control unit 232a controls communication in the power conservation mode. When there is communication for which a standby response is possible, such as a request for a status report, from the host computer 1a (the request at time t32), the standby response control unit 232a sends a response to the request (the response at time t33). Note that if a TCP packet is received with a destination port number other than the port number in the communication settings reported at time t26, the standby response control unit 232a discards the communication as invalid.

If a TCP packet with the destination port number reported at time t26 is received from the host computer 1a (time t34), the standby response control unit 232a decides to return to the normal operating mode (time t35). More specifically, the standby response control unit 232a compares the port number indicated in the destination port number field of the TCP header of the received TCP packet with the port number reported and stored at time t26, and decides to return to the normal operating mode if the ports match.

Figure 5:
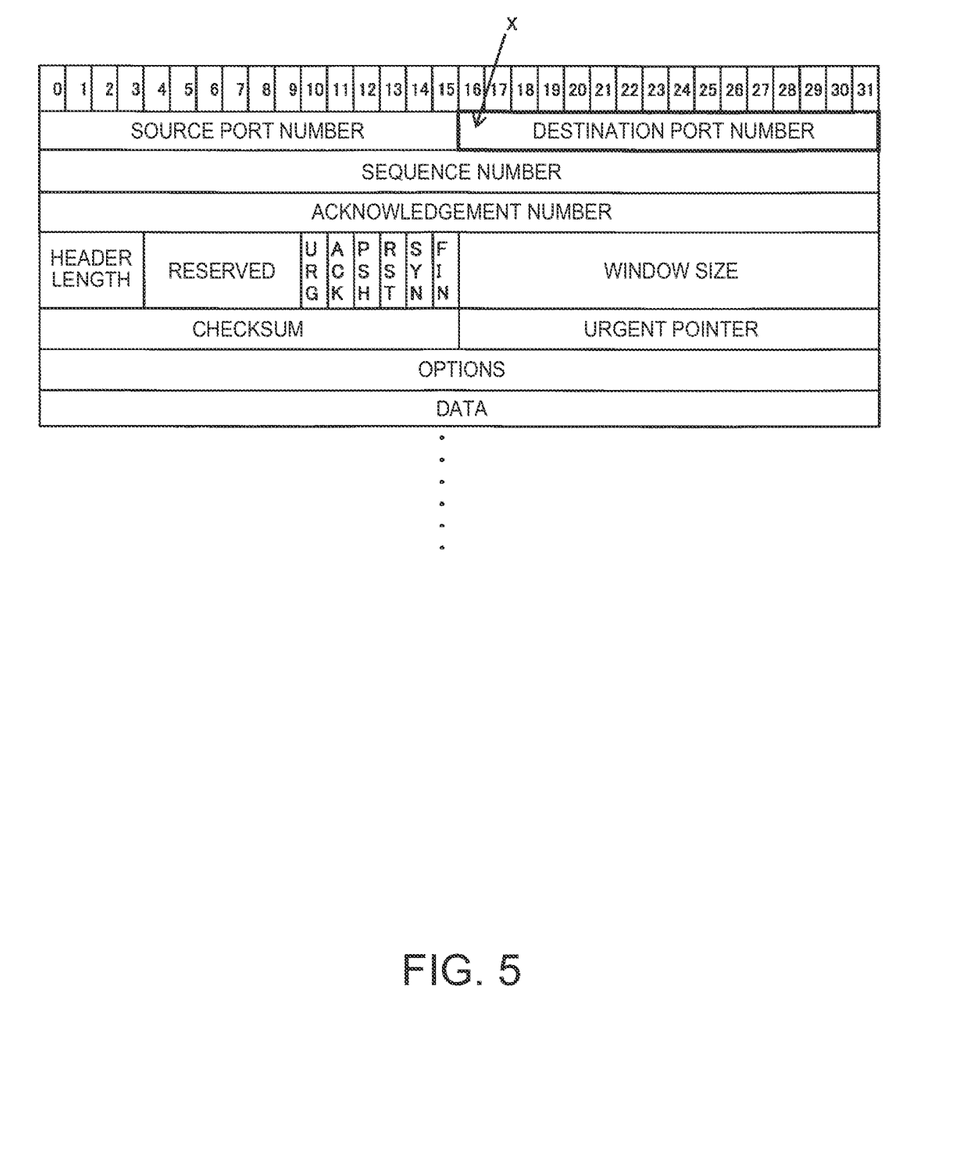
FIG. 5 shows an example of the structure of a TCP header.

FIG. 5 illustrates the format of the TCP header. FIG. 5 shows the format of a common TCP header, and the above destination port number field is the field labelled X in FIG. 5.

The standby response control unit 232a then stops Ethernet communication (time t36), and changes the Ethernet settings to the content (settings) that were previously backed up (stored) at time t27 as described above (time t37). More specifically, the settings used by the network control unit 24a for communication in the normal operating mode are restored.

Next, the standby response control unit 232a instructs the power supply control unit 231a to control the power supply for the normal operating mode. Based on this command, the power supply control unit 231a supplies power to the network control unit 24a, or wakes the CPU of the network control unit 24a from the sleep mode. As a result, the network control unit 24a starts operating.

Next, the standby response control unit 232a of the main control unit 23a sends (passes) the TCP packet received at time t34 to the network control unit 24a (time t39).

The network application control unit 241a of the network control unit 24a receives the transmitted TCP packet, and starts communication by Ethernet (time t40). The network application control unit 241a then sends a response (the response in FIG. 4) to the received TCP packet to the host computer 1a (time t41).

Operation thereafter continues in the normal operating mode.

The operating mode of the printer 2a is thus changed and communication is controlled appropriately to the operating mode.

As described above, the printer 2a according to the second embodiment of the invention is designed to enter a power conservation mode even when a communication connection is established with the host computer 1a if communication related to printing or other main function is not received within a specific time, and returns to the normal operating mode if a TCP packet having the port number of an enabled main function as the destination port number in the TCP header is received while in the power conservation mode. Resuming the normal operating mode can therefore be easily decided appropriately according to the conditions for entering the power conservation mode.

Furthermore, because the power conservation mode is entered even when a communication connection is open to the host computer 1a if communication related to a main function, such as printing, is not received within a specific time (if a TCP packet with a destination port number that matches the receiver port number is not received within the specific time), power conservation is possible even when the communication connection to the host computer is not interrupted in an operating environment in which print requests are infrequent but may come at any time.

Furthermore, because the main control unit 23a and the network control unit 24a have separate CPUs, processing is fast and power conservation is great when the network control unit 24a is turned off.

Note that the invention can obviously be used in electronic devices other than printers.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method for a printer configured to communicate with an external device, the control method comprising:
  providing a printer comprising:
    a print mechanism,
    a network control unit comprising:
      a first communication unit configured to communicate with an external device, and
    a main control unit comprising:
      a print control unit configured to control the print mechanism to print,
      a second communication unit configured to communicate with the external device, and
      a power supply control unit configured to control a power supply to the network control unit,
    wherein the printer is configured to operate in a normal operating mode and a power conservation mode;
  while the printer is operating in the normal operating mode, using the first communication unit to communicate with the external device; and
  while the printer is operating in the power conservation mode, using the power supply control unit to limit or stop the power supply to the network control unit, and using the second communication unit to communicate with the external device and determine whether or not to return the printer to the normal operating mode based on content of data received from the external device.

2. The control method described in claim 1, further comprising:
  while the printer is operating in the power conservation mode, and when the second communication unit determines not to return the printer to the normal operating mode, using the second communication unit to respond to the data received from the external device; and
  while the printer is operating in the power conservation mode, and when the second communication unit determines to return the printer to the normal operating mode, using the power supply control unit to resume a normal power supply to the network control unit, and sending the data received from the external device to the first communication unit.

3. The control method described in claim 1, wherein:
  the second communication unit determines whether or not to return to the normal operating mode based on at least one of a function requested by the received data, and
  (ii) an amount of the received data.

4. The control method described in claim 1, wherein:
  while the printer is operating in the normal operating mode, the first communication unit sends received data to the second communication unit, and the printer enters the power conservation mode when data is not received by the first communication unit for a predetermined amount of time.

5. The control method described in claim 1, wherein:
the second communication unit communicates by TCP.

6. The control method described in claim 1, wherein:
while the printer is operating in the normal operating mode, the first communication unit sends received print request data to the second communication unit, and the print control unit of the second communication unit controls the print mechanism to print based on the print request data.

7. The control method described in claim 1, wherein:
while the printer is operating in the power conservation mode, the second communication unit determines to return to the normal operating mode when the second communication unit receives a TCP packet with a destination port number that matches a receiver port number of the first communication unit.

8. The control method described in claim 1, wherein:
while the printer is operating in the normal operating mode, the printer enters the power conservation mode when the first communication unit does not receive a TCP packet with a destination port number matching a receiver port number of the first communication unit for a predetermined amount of time while a communication connection is open, and
while the printer is operating in the power conservation mode, the printer returns to the normal mode when the second communication unit receives a TCP packet with a destination port number matching the receiver port number of the first communication unit.

9. The control method described in claim 1, further comprising:
while the printer is operating in the power conservation mode, when the second communication unit receives a TCP packet with a destination power number matching a receiver port number of the first communication unit, the printer returns to the normal mode and the second communication sends the TCP packet to the first communication unit.

10. The control method described in claim 1, wherein:
when the printer enters the power conservation mode, the first communication unit reports settings information of the first communication unit to the second communication unit.

11. A printer comprising:
a print mechanism,
a network control unit comprising:
    a first communication unit configured to communicate with an external device, and
a main control unit comprising:
    a print control unit configured to control the print mechanism to print,
    a second communication unit configured to communicate with the external device, and
    a power supply control unit configured to control a power supply to the network control unit
wherein the printer is configured to operate in a normal operating mode and a power conservation mode;
wherein the printer is configured such that:
    while the printer is operating in the normal operating mode, the first communication unit communicates with the external device; and
    while the printer is operating in the power conservation mode, the power supply control unit limits or stops the power supply to the network control unit, and the second communication unit communicates with the external device and determines whether or not to return the printer to the normal operating mode based on content of data received from the external device.

12. The printer described in claim 11, wherein:
the printer is configured such that, while the printer is operating in the normal operating mode, the first communication unit sends received print request data to the second communication unit, and the print control unit of the second communication unit controls the print mechanism to print based on the print request data.

13. The printer described in claim 11, wherein:
the printer is configured such that, while the printer is operating in the power conservation mode, the printer enters the normal mode when the second communication unit receives a TCP packet with a destination port number matching a receiver port number of the first communication unit.

14. The printer described in claim 11, wherein:
the printer is configured such that, while the printer is operating in the normal operating mode, the first communication unit sends received TCP packets to the second communication unit, and the print control unit of the second communication unit controls the print mechanism to print based on the TCP packets received from the first communication unit; and
the printer is configured such that, while the printer is operating in the power conservation mode, the printer enters the normal mode when the second communication unit receives a TCP packet with a destination port number matching a receiver port number of the first communication unit.

15. A non-transitory storage medium storing a program for controlling a printer that is configured to communicate with an external device and includes (i) a print mechanism, (ii) a network control unit comprising: a first communication unit configured to communicate with an external device, and (iii) a main control unit comprising: a print control unit configured to control the print mechanism to print, a second communication unit configured to communicate with the external device, and a power supply control unit configured to control a power supply to the network control unit, wherein the printer is configured to operate in a normal operating mode and a power conservation mode, the program causing the printer to execute steps of:
    while the printer is operating in the normal operating mode, using the first communication unit to communicate with the external device; and
    while the printer is operating in the power conservation mode, using the power supply control unit to limit or stop the power supply to the network control unit, and using the second communication unit to communicate with the external device and determine whether or not to return the printer to the normal operating mode based on content of data received from the external device.

16. The storage medium storing a program described in claim 15, wherein the program causes the printer to execute a further step of:
    while the printer is operating in the power conservation mode, the printer enters the normal mode when the second communication unit receives a TCP packet with a destination port number matching a receiver port number of the first communication unit.

* * * * *